Dec. 24, 1946.  M. A. SCHWARTZ  2,413,079
THERMOSTAT
Filed July 28, 1943
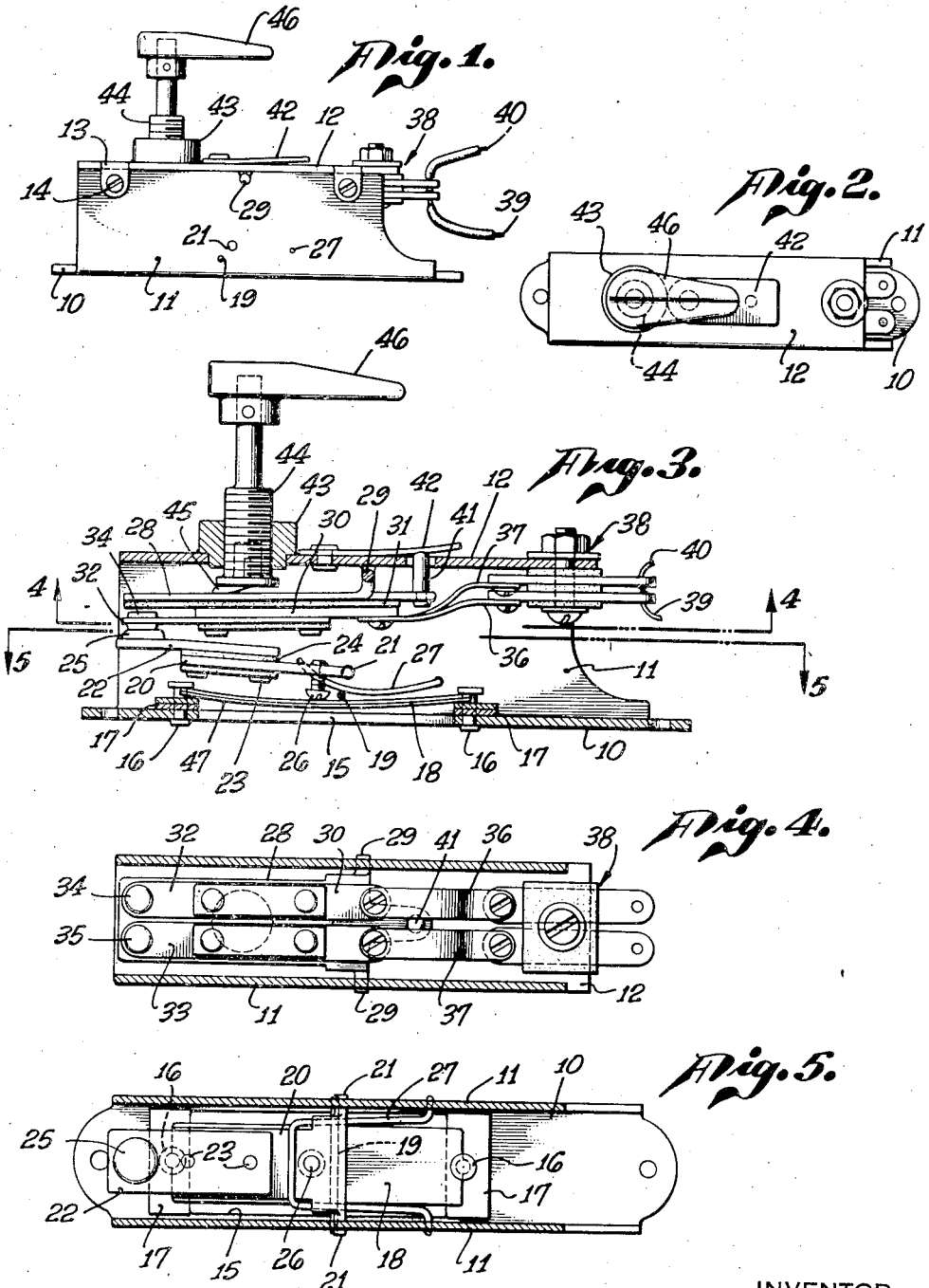
INVENTOR.
MORRIS A. SCHWARTZ,
BY
ATTORNEY.

Patented Dec. 24, 1946

2,413,079

UNITED STATES PATENT OFFICE 2,413,079

THERMOSTAT

Morris A. Schwartz, Los Angeles, Calif.

Application July 28, 1943, Serial No. 496,446

4 Claims. (Cl. 200—139)

This invention relates to improvements in thermostats for electric irons, and is especially designed for use in conjunction with electric steam irons, or that type of iron embodying a steam generator for discharging steam on the ironing surface of the iron.

Many materials, particular synthetic materials that the iron is brought in contact with have critical temperature limits as well as definite moisture requirements. In the case of electric steam irons which embody a steam generator, the thermostat must operate accurately so that the iron will not be permitted to cool below 212° F., otherwise the steam may condense to some extent and injuriously affect the fabric or material. At the same time the thermostat may be required to prevent the temperature exceeding 250° F. in order to avoid scorching or burning of the material that is being pressed.

A primary object of the present invention is to provide an improved thermostat for use in electric irons and analogous devices which will efficiently function to open and close the electric circuit containing the heating element so as to accurately maintain the desired temperature.

More particularly, an object of the invention is to provide a thermostat wherein the thermal responsive means is heat insulated from the body of the iron or heat conductors connected thereto, and which is influenced practically entirely by heat that is radiated from the body of the iron. By utilizing the radiated heat from the body of the iron as distinguished from conducted heat, the thermostat can be made much more sensitive in operation and when operated will operate in accordance with temperatures more truly representative of the ironing surface. If the thermal responsive means is largely influenced by conducted heat there is apt to be a considerable time lag between the ironing surface reaching a certain temperature. The utilization of radiated heat from the body of the iron itself eliminates nearly all of this time lag.

Another object of the invention is to provide a thermostat employing as its thermal responsive means a bimetallic strip, i. e. a strip formed of two metals rigidly connected together which metals have different coefficients of expansion so that under the influence of temperature the strip will alternately tend to curve and straighten and in so doing to provide a means for holding the strip in a normal or cold position that is the same as the position the strip would naturally assume when the strip is subjected to the temperature at one end of the range of temperatures over which the strip is intended to function. Thus, if the bimetallic strip designed to function over a range of temperatures between 212° and 250° F., I prestress or preflex the strip to that position that it would assume when heated to 212° F. In this manner the actual movement of the strip under the influence of heat is merely that movement occasioned in its being heated from 212° F. to 250° F. With the amount of movement thus reduced the thermostat may be made very compact so that it requires a minimum amount of space in the body of the electric iron.

Still another object of the invention is to provide a thermostat for electric irons wherein the thermal responsive element having the above-mentioned characteristics, operates a lever carrying a contact in its swinging end which multiplies the movement of the thermal responsive element, rendering the thermostat quite sensitive to variations in temperature. This contact is arranged to engage and bridge two opposed contacts that are resiliently mounted and by this arrangement the connection of conductors to the lever itself is avoided which otherwise might interfere with or hamper its movement.

With the foregoing and other objects in view, which will be made manifest in the following detailed description, and specifically pointed out in the appended claims, reference is had to the accompanying drawing for an illustrative embodiment of the invention, wherein:

Figure 1 is a view in side elevation of the improved thermostat embodying the present invention;

Fig. 2 is a top plan view of the same;

Fig. 3 is a longitudinal vertical section through the thermostat; and

Figs. 4 and 5 are horizontal sections taken substantially upon the lines 4—4 and 5—5 on Fig. 3, respectively, in the directions indicated.

Referring to the accompanying drawing wherein similar reference characters designate similar parts throughout, the improved thermostat comprises an outer housing or framework which is receivable in a recess provided therefor in the body of an electric iron. This outer housing is preferably formed of sheet metal having a bottom 10, upstanding sides 11, and a cover 12. The cover is preferably provided with ears or lugs 13 attached to the sides, such as by screws 14.

In the bottom of the housing there is formed an elongated opening 15 at the ends of which there are rivets 16 equipped with heat insulation 17 and which serve to support a thermal responsive element 18 therebetween over the opening 15.

The thermal responsive element that I prefer to employ consists merely of an elongated strip formed of two metals having different coefficients of expansion. That metal having the greatest coefficient of expansion is disposed lowermost. The strip being exposed over the opening 15 receives heat from the body of the iron principally by radiation, and when heated the difference in the coefficients of expansion produce a bending or curving of the strip to a somewhat greater degree than is illustrated in Fig. 3. The ends of the strip are notched so as to partially receive the rivets whereby the strip is maintained in place.

In the preferred form of construction a pin 19 extends transversely across the housing against the top of the strip and is so arranged as to maintain the strip in the preflexed or pre-stressed condition. Thus, if the thermostat is intended to open the circuit of the electric heating element of the iron at its minimum temperature of 212° F., pin 19 is so arranged as to flex the strip 18 into that position that the strip would assume under a temperature of 212° F.

In other words, despite cooling of the strip 18 below a temperature of 212° F. the strip will not straighten to any greater degree than that degree of straightness that it has at 212° F. In this manner provision need only be made for accommodating movements of the strip 18 between 212° F. and the upper limit of the range of temperatures over which the thermostat must operate. Consequently the thermostat can be made quite compact in form.

Above the bimetallic strip there is disposed a lever having a lower section 20 equipped with trunnions 21 that serve to pivotally mount the lever at one end between the sides of the housing. This lever is also made up of an upper section 22 that is attached to the lever by means of rivets 23. Electrical insulating material 24 is disposed between these sections to electrically insulate the outer section 22 from the inner or lower section 20.

An electrical contact 25 is connected by the outer or swinging end of the lever. 26 is a screw that is threaded into the inner or lower section 20 of the lever and which has its head bearing against the thermal responsive element 18. By rotation of the screw the adjustment of the lever with relation to the thermal responsive element is possible. I prefer to locate the screw 26 a distance from the fulcrum or axis of rotation of the lever a distance of approximately one-fifth of its entire length so that movements of the bimetallic strip 18 under the influence of heat are magnified or multiplied approximately five times at the location of the contact 25.

A U-shaped spring 27 has its ends extending outwardly through the sides 11 of the housing and extends over the top of the lower section 20. This spring serves to gently but continually hold the lever so that screw 26 is in engagement with the bimetallic strip.

Above the lever there is disposed an upper lever the body of which is indicated at 28 fulcrumed by means of trunnions 29 on the sides of the housing. Bars 30 are riveted or otherwise attached to its underside and are electrically insulated therefrom such as by insulation 31. Each of these bars adjacent its outer end has a leaf spring secured thereto, these springs being indicated at 32 and 33, see Fig. 4. At the outer ends of these springs there are contacts 34 and 35. These contacts are adapted to be bridged by the contact 25. The bars 30 are connected by flexible conductors 36 and 37 to a binding post, generally indicated at 38. Conductors 39 and 40 serve to place the contacts 34 and 35 in circuit with a suitable source of electric current and with the heating element of the iron. The upper lever 28 carries a pin 41 projecting through an aperture in the top of the housing and which is engaged by a leaf spring 42 which urges the lever into a clockwise direction about its fulcrum 29, as viewed in Fig. 3. In the top of the housing there is a nut 43 into which is threaded a shank 44 carrying a cam 45 engageable with the upper lever 28. This shank can be rotated by means of a handle 46. Leaf spring 42 serves to yieldably maintain the upper lever 28 in engagement with the cam and on rotation of the handle 46 the upper lever 28 may be raised or lowered to raise and lower the contacts 34 and 35 thereon as required.

It will be appreciated that as the bimetallic strip is actuated by radiated heat, as distinguished from conducted heat, that it will promptly move in accordance with temperature variations of the body of the iron. When the bimetallic strip is heated to such an extent that it will flex or curve beyond the curvature this allows the lower lever to descend causing contact 25 to disengage contacts 34 and 35, and thus open the circuit to a heating element. When the temperature of the body of the iron falls and the bimetallic strip returns to the position shown contact 25 reestablishes the electric circuit across contacts 34 and 35 and through the heating element so as to bring the temperature of the iron back up to the desired degree. The desired degree can, of course, be varied by rotating handle 46 and cam 45 so as to raise and lower the positions of the contacts 34 and 35. As these contacts are yieldably mounted by means of their leaf springs 32 and 33, they will not interfere with movements of the lower lever. It will be noted that as no conductors, such as conductors 36 and 37, are connected to the lower lever that these conductors will in no way interfere with the proper or free movement of the lower lever which is actuated by the thermal responsive means.

Ordinarily, as the iron cools, contraction of the lower metal of the bimetallic strip is sufficient to actuate this strip with adequate force or power to lift the lower lever. However, in some instances it may be desirable to place a steel spring 47 between the rivets and which will bear against the under side of the bimetallic strip at all times, urging it to return to its uppermost position against pin 19. The effect of this spring is, of course, overcome when the bimetallic strip is flexed under the influence of heat, but when the strip is allowed to cool the spring may become effective to urge the strip to return to its initial position and actuate the lower lever accordingly.

From the above-described construction it will be appreciated that a simple compact sturdy thermostat is provided which is highly sensitive and quickly responsive to temperature variations of the iron in which it may be installed, the arrangement being such that the tendency towards arcing across the contacts 25, 34, and 35 on the making or breaking of the electric circuit is reduced to a minimum. The construction is highly advantageous over thermostats employing snap-over discs which under the influence of heat snap from a concavo-convex condition into a convexo-concave condition. Such snap-over discs require considerable force to actuate them and are consequently slow in operation. When operated the snapping is apt to cause injury to the contacts which is entirely avoided in the smooth operation of the present thermostat.

Various changes may be made in the details of construction without departing from the spirit and scope of the invention as defined by the appended claims, wherein I claim:

1. A thermostat for use in electric irons and the like comprising a bimetallic element mounted between spaced points and adapted to flex therebetween under the influence of heat, a lever carrying a contact engageable with and disengageable from another contact to open and close an electric circuit, and means for causing the lever to be moved in response to flexures of the bimetallic element but in such a manner that the movements of the contact will be at a multiplied rate of the movements of the bimetallic element, said bimetallic element being bowed and prestressed to a position that it would assume under the influence of heat at one end of the temperature range over which it is to operate and from which position upon a rise in temperature it will continue to bow in the same direction whereby until said end of the temperature range is reached said means and lever will remain undisturbed, and on a rise in temperature therefrom, said means and lever will be moved in accordance with temperature variations.

2. A thermostat for use in electric irons and the like comprising a bimetallic element mounted between spaced points and adapted to flex therebetween under the influence of heat, a pair of electrical contacts in an electric circuit one of which is movable into and out of engagement with the other, and means for moving one of the contacts toward and away from the other by the bimetallic element at a multiplied rate of movement of the bimetallic element, said bimetallic element being bowed and prestressed to a position that it would assume under the influence of heat at one end of the temperature range over which it is to operate and from which position upon a rise in temperature it will continue to bow in the same direction whereby until said end of the temperature range is reached said means and lever will remain undisturbed, and on a rise in temperature therefrom, said means and lever will be moved in accordance with temperature variations.

3. A thermostat for use in electric irons and the like comprising a bimetallic element arranged to flex under the influence of heat, means prestressing the bimetallic element in the direction in which it flexes under the influence of heat to the position which it assumes at the lower end of the temperature range over which it is intended to operate, and means operable by the flexing of the bimetallic element for controlling an electric circuit whereby upon a rise in temperature the bimetallic element will not be disturbed nor caused to move until said lower end of the temperature range is reached, and thereafter it will continue to flex in the same direction beyond the position that it is caused to assume under the prestressing.

4. A thermostat for use in electric irons and the like comprising a bimetallic element arranged to flex under the influence of heat, means prestressing the bimetallic element in the direction in which it flexes under the influence of heat to the position which it assumes at the lower end of the temperature range over which it is intended to operate, and means operable by the flexing of the bimetallic element for controlling an electric circuit whereby upon a rise in temperature the bimetallic element will not be disturbed nor caused to move until said lower end of the temperature range is reached, and thereafter it will continue to flex in the same direction beyond the position that it is caused to assume under the prestressing, the circuit control means being arranged to magnify movements of the bimetallic element.

MORRIS A. SCHWARTZ.